Feb. 26, 1957  J. HASSLER  2,783,362
MULTIPLE ELECTRODE ARC WELDING ASSEMBLY
Filed Dec. 1, 1954
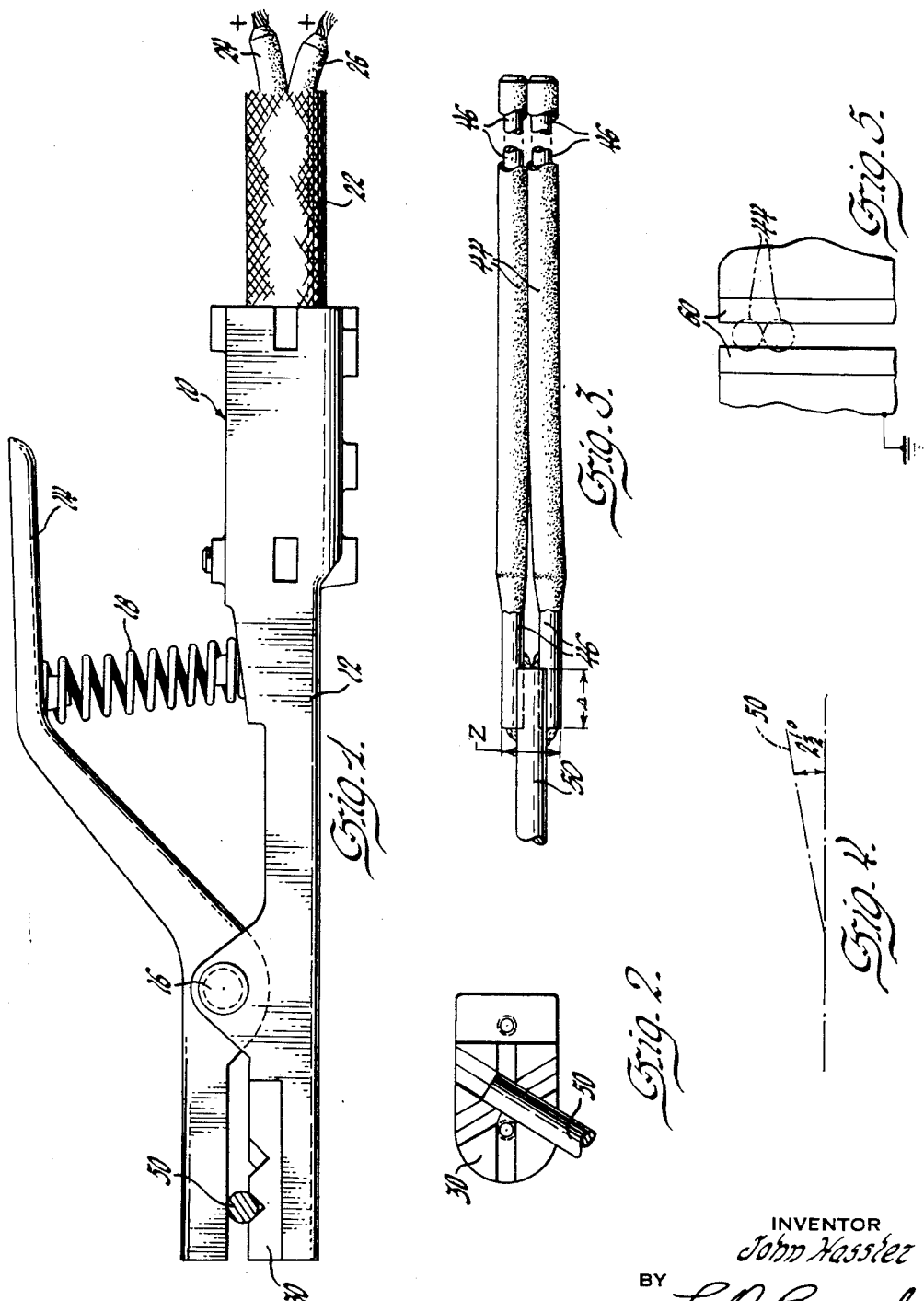
INVENTOR
John Hassler
BY
L. D. Burch
ATTORNEY

United States Patent Office 2,783,362
Patented Feb. 26, 1957

2,783,362

MULTIPLE ELECTRODE ARC WELDING ASSEMBLY

John Hassler, Cleveland, Ohio, assignor to General Motors Corporation, Detroit, Mich., a corporation of Delaware Application December 1, 1954, Serial No. 472,495

5 Claims. (Cl. 219—146)

This invention relates to an improved multiple welding electrode design for metallic arc welding using contiguous or juxtaposed multiple electrodes.

Such apparatus is specially suited for use in open arc welding of beveled or V-shaped groove joints as are employed in thick weldments including armor metal and heavy plates which, in order to pass rigid ordnance specifications, must be formed with strong and metallurgically sound welds of high impact properties. In the welding of grooved joints of this character, it has been found that the diameter size of the welding electrode is determined largely by the width of the groove opening in order to avoid slag inclusions and inferior welds that are produced when large electrodes are employed in narrow openings. These considerations dictate the use of small diameter electrodes, which require reduced welding currents and result in increasing the time required to lay a weld. While currents in excess of those specified for the particular diameter size of electrode being used may be employed, this creates, among other things, overheating of the electrode with resultant excess stub length.

The present invention seeks generally to provide improved apparatus for metallic arc welding using contiguous or juxtaposed multiple welding electrodes in which the welding current is applied to but one electrode at a time and is transferred from one electrode to another as the ends of the electrodes are alternately consumed.

Such apparatus and welding procedure have been found to provide a substantial increase in welding speed and deposition of weld material over single electrode methods while using electrodes of small diameter size and permitting the use of currents in excess of those specified for a given electrode size without overheating of the electrodes and resulting excessive electrode stub lengths.

The present invention has among its specific objects to provide an improved dual electrode assembly which may be received and firmly gripped in a conventional electrode holder, which readily may be adjusted or positioned in the work holder to accommodate various welding conditions and to suit the individual welding technique of the operator without causing operator fatigue, and which affords maximum consumption of the welding electrodes with a minimum of scrappage.

The above and other objects together with the features and advantages of the present invention will appear more fully from the following description and drawings wherein:

Fig. 1 illustrates a conventional electrode holder for a dual welding electrode assembly in accordance with the present invention;

Fig. 2 illustrates a form of clamping jaw that may be employed in the electrode holder of Fig. 1;

Fig. 3 illustrates a form of multiple welding electrode assembly in accordance with the present invention;

Fig. 4 is a diagrammatic illustration of the manner in which the elements of the welding electrode assembly of the present invention may be oriented relative to each other; and Fig. 5 is a plan illustration of the manner in which the electrode assembly may be oriented relative to the direction of the joint between a pair of weldments.

Referring to the drawings, the electrode holder shown generally at 10 in Fig. 1 comprises a base 12 and an offset handle 14 pivotally mounted on the base as at 16 with a spring tension member 18 spaced from the pivot and extending between the base and handle, substantially as shown. One end of the base 12 is clamped to a current supply cable 22 which may contain a plurality of braided conductors 24, 26 that are adapted to be connected to the same terminal of an A. C. or D. C. electric welding generator or source (not shown), the other terminal of which is connected to ground. The other end of the base 12 includes a grooved insert element 30 best shown in Fig. 2. This element is of conventional design and is provided with a plurality of intersecting grooves in the face thereof in which the multiple welding electrode design of the present invention may be received.

The electrodes shown in Fig. 3 are of the austenitic variety having an insulating flux coating 44 over a central core 46 or weld rod. The insulating covering near the holder end of the electrodes is "skinned" back a short distance so that their central cores or weld rods are exposed. The electrodes then are geometrically positioned with their axes in a common plane and their flux coatings parallel and preferably flush to or in contact with each other and in accordance with the present invention are joined together at their skinned ends with a spreader or spacer member in the form of a stub 50 which is received in the jaws of the holder of Fig. 1 and carries current therefrom. The stub 50 causes the electrodes to converge towards each other and since the electrodes are of substantial length and are disposed as described above, the electrodes will touch a short distance from their skinned ends and will bow towards each other so as to be held in tension with their insulated coatings touching over a major portion of their length measured from the workpiece end thereof. In this manner the spacing between the weld rods is kept to a minimum and the rods will remain in contacting relation as they are consumed until they are too short to be used.

Preferably, the stub 50 is resistance welded to the rods 46 in order to provide full fusion thereto and sufficient contact and current carrying area therewith. In fabricating the electrode assembly, some increase in contact and current carrying area between the stub and the skinned ends of the welding electrodes may be obtained by inclining the stub 50 at a slight angle, say about 2½ degrees, to the plane containing the axis of the welding electrodes, as shown diagrammatically at Fig. 4 herein.

The stub 50 can be of any shape, although a round stub may be preferred in order that the dual unit can be positioned freely in any standard electrode holder. The use of a round stub permits the operator to turn the multiple electrode assembly to the position most comfortable for his technique and to accommodate a wide variety of different welding conditions without requiring the operator to hold the holder in any unorthodox, uncomfortable or ususual position. The stub may be of mild steel composition and should be of sufficient diameter to fill the space between the skinned ends of the electrodes and to carry the welding current without excessive overheating. Since the stub 50 carries current continuously, it will necessarily be of larger diameter than the individual electrodes which are only intermittently energized. The stub is placed on top of the two electrodes with the dimension z controlled so as to prevent overspreading of the electrodes during resistance welding of the stub thereto and to assure that the stub will fuse properly and become an integral part of the two electrodes.

The recommended stub diameters for dual 5/32 and 3/16 inch welding electrodes are ³⁄₁₆ and ¼ inch, respectively. The length of the stub for these sizes preferably should be adequate to permit around ⅜ inch lap, as indicated by *s* in Fig. 3, over the skinned electrodes and also to permit secure gripping by the electrode holder. For other electrode sizes the distance *s* should be such as will permit maximum inward bowing or tensioning of the electrodes so that the electrodes will be in contacting relation over substantially their entire length. Lap lengths *s* in excess of ⅜ inch for the above specified electrode sizes will cause the electrodes to bow outwardly and to contact at the workpiece end which is undesirable from the standpoint of the quality of the weld produced and the form of arc or arcs obtained therewith.

A recommended overall length of the stub is 1½ inches which has been found to afford maximum consumption of the electrodes and minimum scrappage.

Since the flux coatings of the electrodes are partially insulating, welding current will be carried by only one electrode at a time and will flow through the electrode that is brought closest to the grounded workpiece 60. An arc will then be established between the end of that electrode and the workpiece so as to burn off material from the end of the electrode. After so much of the end of the first energized electrode has been consumed and deposited in the weld that the electrode-to-workpiece gap spacing of an adjacent electrode is less than or offers less resistance to flow of current than the first energized electrode, the welding current is automatically transferred or switched to the adjacent electrode and establishes an arc between its end and ground to burn off enough of its end as to transfer the current back to the first electrode or to another electrode, if more than two electrodes are employed. The welding current is thus transferred aperiodically between the electrodes which are alternately or successively consumed at a substantially uniform rate.

The electrode holder 10 is held in the gloved hands of the operator and in a position such that one electrode precedes the other in relation to the direction of the length of the grooved joint to be welded, as shown generally in Fig. 5. Each electrode appears to establish its own arc as the current is switched from one electrode to another, resulting in a rolling arc which not only aids in the deposition of the weld material but creates some agitation and slight turbulence of the molten weld pool and tends to require less manipulation by the operator in the course of laying the weld thus lessening operator fatigue. This agitation tends to cook out to a greater degree foreign impurities and gases and results in a superior weld that has been found to be metallurgically sound and possessed of good impact properties.

It will be seen that the multiple electrode design of the invention permits of the use of small diameter size electrodes and since the welding current is carried by only one electrode at a time, currents in excess of those specified for a given electrode diameter size may be employed. Sufficient cooling is acquired by the electrode or electrodes not being consumed to allow working the electrodes at higher current densities without undue overheating.

What is claimed is:

1. A dual welding electrode assembly comprising a pair of separate, distinct welding electrodes each having a separate insulating flux coating over a central core with one end of each electrode having the coating skinned from the core thereof, and electrode spreading means at the skinned ends of said electrodes holding the electrodes at a slight angle to each other with the electrodes converging and held in tension against each other and their insulating coatings touching and in line contact relation over a major portion of their length.

2. A dual welding electrode assembly comprising a pair of separate, distinct welding electrodes each having a separate insulating flux coating over a central core with one end of each electrode having the coating skinned from the core thereof, and electrode spreading means between the cores at the skinned ends of said electrodes including an electrode stub of greater cross-section and current carrying capacity than either of said electrodes, said stub being united to and lapping the cores at the skinned ends of the electrodes a slight distance until the electrodes are tensioned against each other with the insulating coatings thereof touching and held in line contact relation over a major portion of the length of the electrodes.

3. A welding electrode assembly in accordance with claim 2 above wherein said electrode stub is of circular cross-section and is resistance welded to the skinned ends of said welding electrodes.

4. A welding electrode assembly in accordance with claim 2 above wherein said electrode stub is circular cross-section resistance welded to the skinned ends of said welding electrodes and is inclined at a slight angle to the electrodes.

5. A multiple electrode welding assembly for providing a welded joint between a pair of weldments comprising a multiple welding electrode which includes a pair of separate, distinct welding electrodes each having a separate insulating flux coating over a central core with one end of each electrode having the coating skinned from the core thereof and an electrode stub united to and positioned between the cores at the skinned ends of the electrodes, said stub being positionable in an electrode holder so that one electrode precedes the other in relation to the direction of the joint between said weldments, said stub lapping the cores at the skinned ends of the electrodes a slight distance until the electrodes are tensioned against each other with the insulating coatings thereof touching and held in line contact relation over a major portion of the length of the electrodes.

References Cited in the file of this patent

UNITED STATES PATENTS

| | | |
|---|---|---|
| 1,450,294 | Jerry | Apr. 3, 1923 |
| 1,759,686 | Carlson | May 20, 1930 |
| 1,773,653 | Turner | Aug. 19, 1930 |
| 1,834,069 | Miller | Dec. 1, 1931 |
| 1,857,521 | Stresau et al. | May 10, 1932 |
| 2,146,601 | Somerville | Feb. 7, 1939 |
| 2,520,112 | Bourque et al. | Aug. 29, 1950 |